(12) United States Patent
Ryan et al.

(10) Patent No.: US 12,544,099 B2
(45) Date of Patent: Feb. 10, 2026

(54) TISSUE-REMOVING CATHETER WITH COUPLED INNER LINER

(71) Applicant: MEDTRONIC VASCULAR, INC., Santa Rosa, CA (US)

(72) Inventors: Alan Ryan, Galway (IE); Eoghan Jennings, Summerhill (IE); Aran Murray, Galway (IE)

(73) Assignee: MEDTRONIC VASCULAR, INC., Santa Rosa, CA (US)

( * ) Notice: Subject to any disclaimer, the term of this patent is extended or adjusted under 35 U.S.C. 154(b) by 516 days.

(21) Appl. No.: 17/653,069

(22) Filed: Mar. 1, 2022

(65) Prior Publication Data

US 2022/0313308 A1     Oct. 6, 2022

Related U.S. Application Data

(60) Provisional application No. 63/169,342, filed on Apr. 1, 2021.

(51) Int. Cl.
*A61B 17/3207*     (2006.01)
*A61B 17/00*     (2006.01)
(Continued)

(52) U.S. Cl.
CPC ........... *A61B 17/320783* (2013.01); *A61B 2017/00831* (2013.01); *A61B 2017/00845* (2013.01);
(Continued)

(58) Field of Classification Search
CPC ........ A61B 17/3207; A61B 17/320758; A61B 17/320725; A61B 17/320783;
(Continued)

(56) References Cited

U.S. PATENT DOCUMENTS 4,808,069 A * 2/1989 Bonner ............... F01D 17/162
411/92
5,131,818 A * 7/1992 Wittkop ............... F04B 53/008
92/170.1
(Continued)

OTHER PUBLICATIONS

International Search Report and Written Opinion for PCT/IB2022/05298, May 27, 2022, 11 pages, Rijswijk, Netherlands.

*Primary Examiner* — Darwin P Erezo
*Assistant Examiner* — Mitchell Brian Hoag
(74) *Attorney, Agent, or Firm* — Stinson LLP

(57) ABSTRACT

The present disclosure provides a tissue-removing catheter that includes an elongate body with proximal and distal end portions, a tissue-removing element, an inner liner, and a coupling assembly. The tissue-removing element removes tissue by rotation from the elongate body. The inner liner defines a guidewire lumen received within the elongate body and is coupled to the tissue-removing element at its distal end portion. The coupling assembly includes a bushing attached to the distal end portion of the inner liner and a bearing disposed around the bushing with an exterior surface of the bushing contacting an interior surface of the bearing along less than 50% of an internal surface area of the interior surface of the bearing. At least one of the exterior surface of the bushing and the interior surface of the bearing may define a non-uniform dimension extending along a length of one of the bushing and bearing.

10 Claims, 13 Drawing Sheets

(51) Int. Cl.
*A61B 17/22* (2006.01)
*A61B 17/32* (2006.01)
*A61B 90/00* (2016.01)

(52) U.S. Cl.
CPC .............. *A61B 2017/22038* (2013.01); *A61B 2017/320004* (2013.01); *A61B 17/320758* (2013.01); *A61B 2090/08021* (2016.02)

(58) Field of Classification Search
CPC .... A61B 2017/32004; A61B 17/00008; A61B 17/221; A61B 17/320016; A61B 2017/320775; A61B 17/32002; A61B 2017/320024; A61B 2017/320028; A61B 2017/320032; A61B 17/320036; A61B 17/320708; A61B 17/32075; A61B 2017/320716; A61B 2017/320733; A61B 2017/320741

See application file for complete search history.

(56) References Cited

U.S. PATENT DOCUMENTS

| | | | | |
|---|---|---|---|---|
| 5,136,931 | A * | 8/1992 | Kita | F04B 1/1072 417/498 |
| 5,334,211 | A * | 8/1994 | Shiber | A61B 18/245 606/159 |
| 5,431,673 | A * | 7/1995 | Summers | A61B 17/320783 606/171 |
| 5,727,129 | A * | 3/1998 | Barrett | G06F 16/9574 709/224 |
| 10,987,126 | B2 | 4/2021 | Jamous et al. | |
| 11,406,419 | B2 * | 8/2022 | Schoenle | A61B 17/320758 |
| 2002/0135115 | A1 * | 9/2002 | Hayashi | F16F 1/3842 267/141.2 |
| 2003/0132593 | A1 * | 7/2003 | Ross | F16F 1/387 280/124.1 |
| 2004/0152955 | A1 * | 8/2004 | McGinley | A61B 17/1703 600/300 |
| 2006/0074442 | A1 * | 4/2006 | Noriega | A61M 25/09 606/159 |
| 2007/0123933 | A1 * | 5/2007 | Johnson | A61B 17/2909 606/205 |
| 2010/0217245 | A1 * | 8/2010 | Prescott | A61B 17/32002 606/1 |
| 2011/0112536 | A1 * | 5/2011 | Dooney, Jr. | A61B 17/8047 606/70 |
| 2011/0319754 | A1 * | 12/2011 | Solar | A61M 1/3613 604/509 |
| 2012/0109171 | A1 | 5/2012 | Zeroni et al. | |
| 2013/0018402 | A1 * | 1/2013 | Polo | A61B 17/320016 606/170 |
| 2014/0219845 | A1 * | 8/2014 | Hugenroth | A61M 16/0057 418/13 |
| 2015/0164531 | A1 * | 6/2015 | Faller | A61B 17/320092 606/169 |
| 2015/0314111 | A1 * | 11/2015 | Solar | A61M 25/1011 604/509 |
| 2016/0331645 | A1 * | 11/2016 | Bagwell | A61J 15/0026 |
| 2016/0374716 | A1 * | 12/2016 | Kessler | A61B 17/320758 606/159 |
| 2017/0217493 | A1 * | 8/2017 | Byrne | B62D 7/18 |
| 2017/0308409 | A1 * | 10/2017 | Christensen | A61B 17/12 |
| 2018/0029138 | A1 * | 2/2018 | Wagner | B23Q 1/25 |
| 2018/0172356 | A1 * | 6/2018 | Whalley | F28F 3/025 |
| 2018/0296234 | A1 * | 10/2018 | Eads | A61B 17/221 |
| 2018/0317952 | A1 * | 11/2018 | Jamous | A61B 17/320783 |
| 2018/0326184 | A1 * | 11/2018 | Sisco | A61M 25/02 |
| 2019/0105087 | A1 * | 4/2019 | Sommers | A61B 17/1615 |
| 2019/0365412 | A1 * | 12/2019 | Was | A61B 17/320758 |
| 2020/0205845 | A1 * | 7/2020 | Yang | A61M 25/0108 |
| 2020/0300279 | A1 * | 9/2020 | Root | F16B 2/12 |
| 2020/0397466 | A1 * | 12/2020 | Nakano | A61B 17/320758 |
| 2020/0405495 | A1 * | 12/2020 | Gatrell | A61B 17/1684 |
| 2021/0131229 | A1 * | 5/2021 | Minnis | A61B 17/320725 |
| 2021/0220013 | A1 * | 7/2021 | Libarnes | A61B 17/12022 |
| 2021/0275210 | A1 | 9/2021 | Nishio et al. | |
| 2022/0008102 | A1 * | 1/2022 | Charest | A61B 17/7004 |
| 2022/0323098 | A1 * | 10/2022 | Jamous | A61B 17/320758 |
| 2022/0333508 | A1 * | 10/2022 | Radulescu | F01L 13/0005 |
| 2022/0354545 | A1 * | 11/2022 | Wenzel | A61B 17/7032 |
| 2022/0387071 | A1 * | 12/2022 | To | A61B 17/320758 |
| 2023/0063821 | A1 * | 3/2023 | Ganske | A61F 2/014 |
| 2023/0149035 | A1 * | 5/2023 | Sirhan | A61M 25/005 604/508 |
| 2023/0389909 | A1 * | 12/2023 | Marine | A61B 17/00234 |
| 2025/0009380 | A1 * | 1/2025 | Murray | A61B 17/320758 |

* cited by examiner

TISSUE-REMOVING CATHETER WITH COUPLED INNER LINER

CROSS-REFERENCE TO RELATED APPLICATION

This application claims the benefit of U.S. Provisional Patent Application Ser. No. 63/169,342, filed on Apr. 1, 2021, the entire contents of which are hereby incorporated by reference.

FIELD

The present disclosure generally relates to a tissue-removing catheter, and more particular, to a tissue-removing catheter having a coupled inner liner.

BACKGROUND

Tissue-removing catheters are used to remove unwanted tissue in body lumens. As an example, atherectomy catheters are used to remove material from a blood vessel to open the blood vessel and improve blood flow through the vessel. This process can be used to prepare lesions within a patient's coronary artery to facilitate percutaneous coronary angioplasty (PTCA) or stent delivery in patients with severely calcified coronary artery lesions. Atherectomy catheters typically employ a rotating element which is used to abrade or otherwise break up the unwanted tissue.

SUMMARY

In one aspect, a tissue-removing catheter for removing tissue in a body lumen generally comprises an elongate body having an axis, and proximal and distal end portions spaced apart from one another along the axis. The elongate body is sized and shaped to be received in the body lumen. A tissue-removing element is mounted on the distal end portion of the elongate body. The tissue-removing element is configured to remove the tissue as the tissue-removing element is rotated by the elongate body within the body lumen. An inner liner is received within the elongate body and defines a guidewire lumen. The inner liner is coupled to the tissue-removing element at a distal end portion of the inner liner. A coupling assembly is disposed in the tissue-removing element for coupling the inner liner to the tissue-removing element. The coupling assembly comprises a bushing attached to the distal end portion of the inner liner and a bearing disposed around the bushing such that an exterior surface of the bushing opposes an interior surface of the bearing. The exterior surface of the bushing contacts the interior surface of the bearing along less than 50% of an internal surface area of the interior surface of the bearing.

In another aspect, a tissue-removing catheter for removing tissue in a body lumen generally comprises an elongate body having an axis, and proximal and distal end portions spaced apart from one another along the axis. The elongate body is sized and shaped to be received in the body lumen. A tissue-removing element is mounted on the distal end portion of the elongate body. The tissue-removing element is configured to remove the tissue as the tissue-removing element is rotated by the elongate body within the body lumen. An inner liner is received within the elongate body and defines a guidewire lumen. The inner liner is coupled to the tissue-removing element at a distal end portion of the inner liner. A coupling assembly is disposed in the tissue-removing element for coupling the inner liner to the tissue-removing element. The coupling assembly comprises a bushing attached to the distal end portion of the inner liner and a bearing disposed around the bushing such that an exterior surface of the bushing opposes an interior surface of the bearing. At least one of the exterior surface of the bushing and the interior surface of the bearing defines a non-uniform dimension extending along a length of one of the bushing and bearing.

BRIEF DESCRIPTION OF THE DRAWINGS

Corresponding reference characters indicate corresponding parts throughout the drawings.

DETAILED DESCRIPTION

Figure 1:
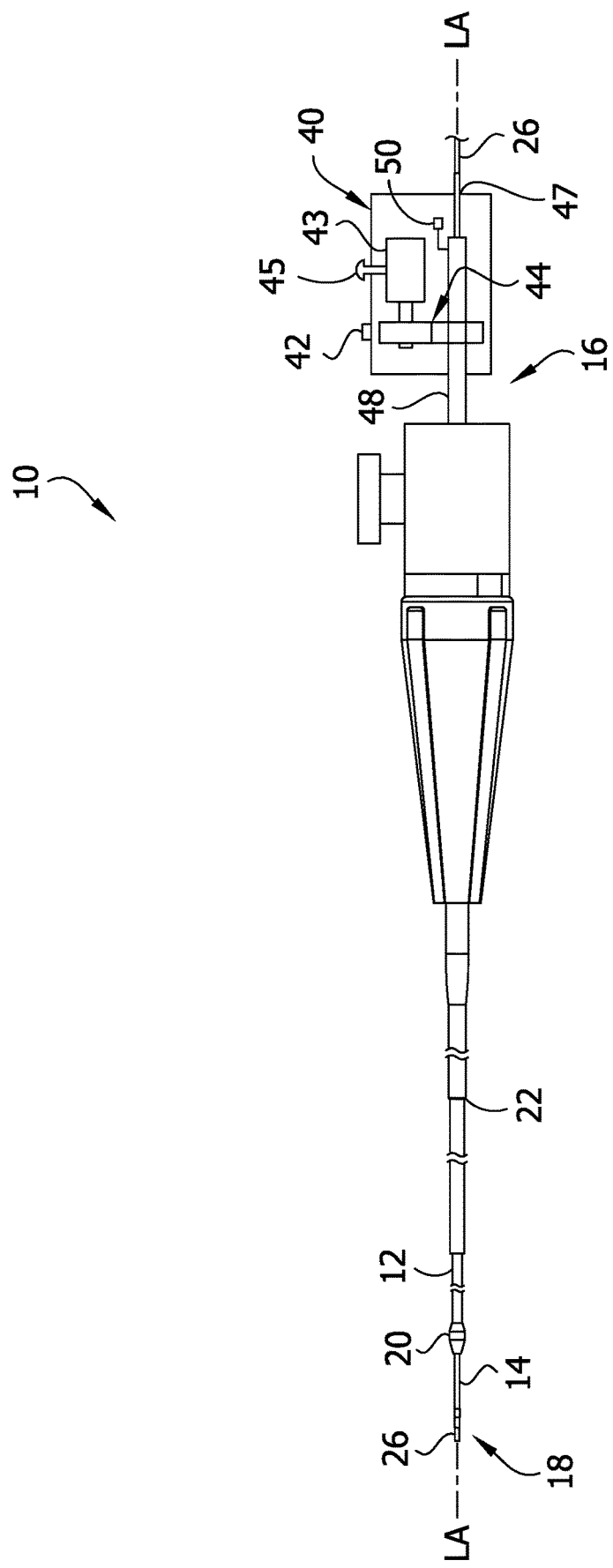
FIG. 1 is a schematic illustration of a catheter of the present disclosure.

Referring to the drawings, and in particular FIG. 1, a rotational tissue-removing catheter for removing tissue in a body lumen is generally indicated at reference number 10. The illustrated catheter 10 is a rotational atherectomy device suitable for removing (e.g., abrading, cutting, excising, ablating, etc.) occlusive tissue (e.g., embolic tissue, plaque tissue, atheroma, thrombolytic tissue, stenotic tissue, hyperplastic tissue, neoplastic tissue, etc.) from a vessel wall (e.g., coronary arterial wall, etc.). The catheter 10 may be used to facilitate percutaneous coronary angioplasty (PTCA) or the subsequent delivery of a stent. Features of the disclosed embodiments may also be suitable for treating chronic total occlusion (CTO) of blood vessels, and stenoses of other body lumens and other hyperplastic and neoplastic conditions in other body lumens, such as the ureter, the biliary duct, respiratory passages, the pancreatic duct, the lymphatic duct, and the like. Neoplastic cell growth will often occur as a result of a tumor surrounding and intruding into a body lumen. Removal of such material can thus be beneficial to maintain patency of the body lumen.

The catheter 10 is sized for being received in a blood vessel of a subject. Thus, the catheter 10 may have a maximum size of 3, 4, 5, 6, 7, 8, 9, 10, or 12 French (1, 1.3, 1.7, 2, 2.3, 2.7, 3, 3.3, or 4 mm) and may have a working length of 20, 30, 40, 60, 80, 100, 120, 150, 180 or 210 cm depending of the body lumen. While the remaining discussion is directed toward a catheter for removing tissue in blood vessels, it will be appreciated that the teachings of the present disclosure also apply to other types of tissue-removing catheters, including, but not limited to, catheters for penetrating and/or removing tissue from a variety of occlusive, stenotic, or hyperplastic material in a variety of body lumens.

Figure 2:
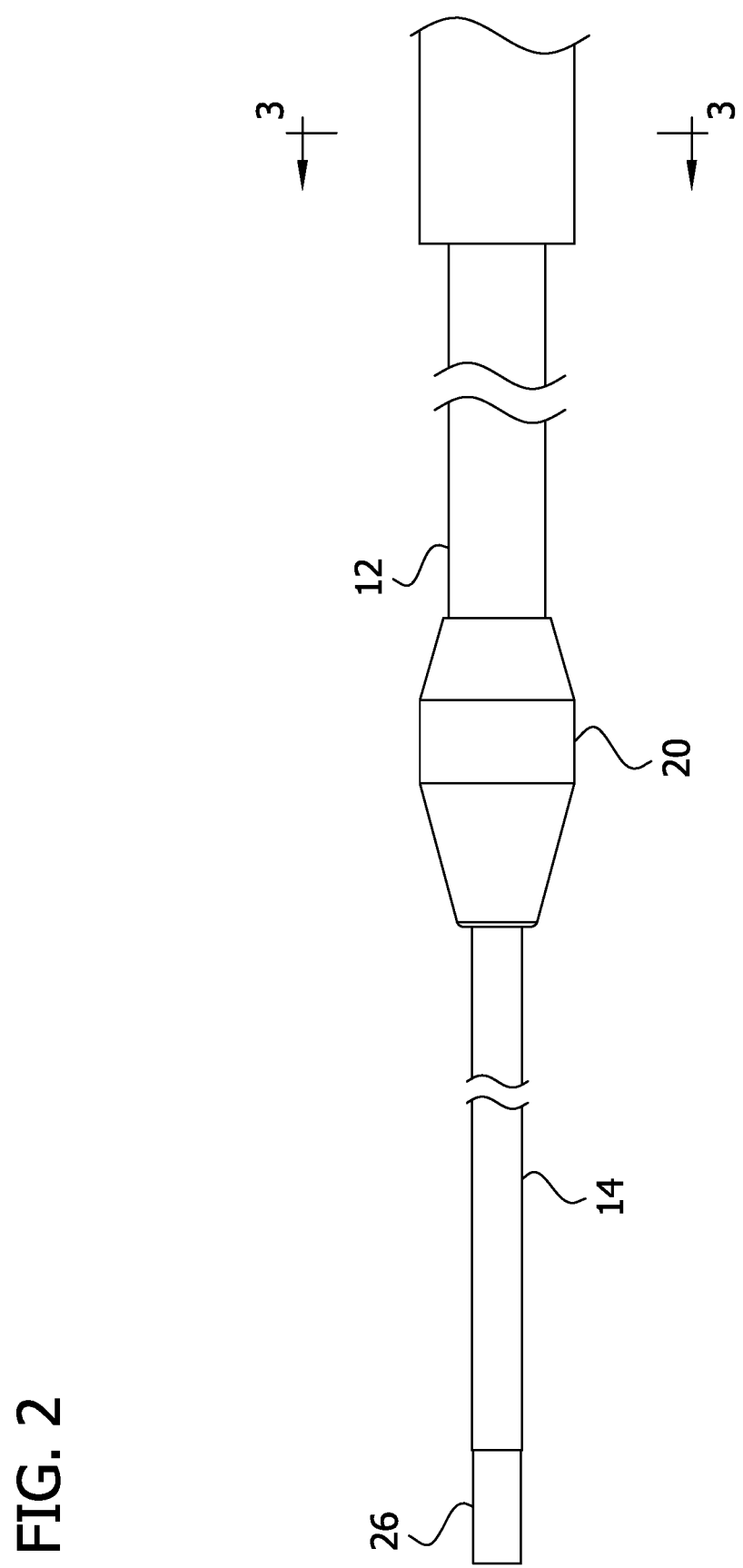
FIG. 2 is an enlarged elevation of a distal end portion of the catheter in FIG. 1.
Figure 3:
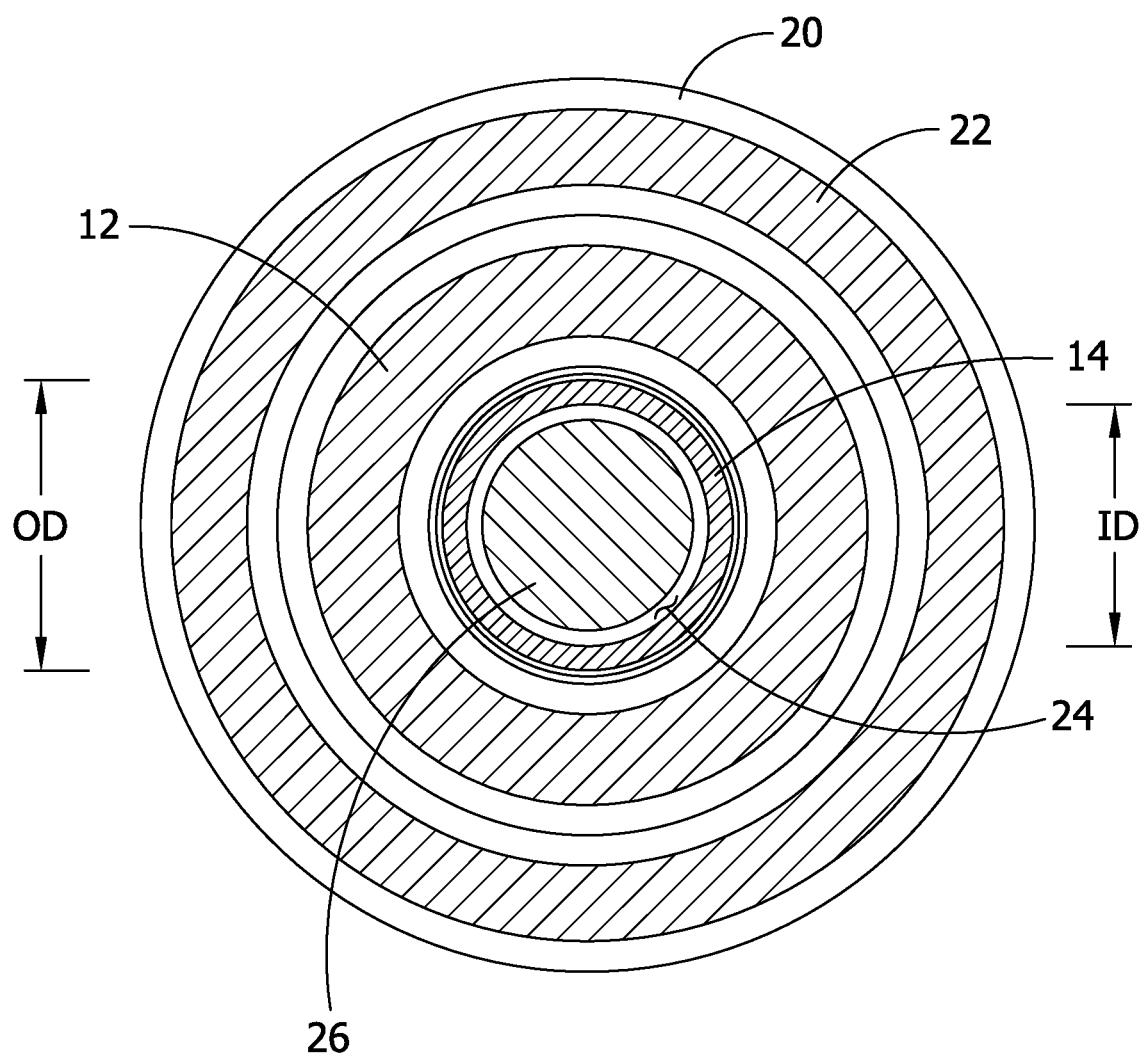
FIG. 3 is a cross section taken through line 3-3 in FIG. 2.

Referring to FIGS. 1-3, the catheter 10 comprises an elongate drive coil 12 (broadly, an elongate body) disposed around an elongate inner liner 14. The drive coil 12 and inner liner 14 extend along a longitudinal axis LA of the catheter from a proximal end portion 16 to a distal end portion 18 of the catheter. A tissue-removing element 20 is disposed on a distal end of the drive coil 12 and is configured for rotation to remove tissue from a body lumen as will be explained in greater detail below. An isolation sheath 22 is disposed around the drive coil 12. The drive coil 12 and the inner liner 14 are both configured to translate relative to the isolation sheath 22. The catheter 10 is sized and shaped for insertion into a body lumen of a subject. The isolation sheath 22 isolates the body lumen from at least a portion of the drive coil 12 and inner liner 14. The inner liner 14 defines a guidewire lumen 24 (FIG. 3) for slidably receiving a guidewire 26 therein so that the catheter 10 can be advanced through the body lumen by traveling along the guidewire. The guidewire can be a standard 0.014-inch outer diameter, 300 cm length guidewire. In certain embodiments, the inner liner 14 may have a lubricious inner surface for sliding over the guidewire 26 (e.g., a lubricious surface may be provided by a lubricious polymer layer or a lubricious coating). In the illustrated embodiment, the guidewire lumen 24 extends along an entire working length of the catheter 10. In one embodiment, the overall working length of the catheter 10 may be between about 135 cm (53 inches) and about 142 cm (56 inches). In use, the guidewire 26 may extend about 40 mm (1.6 inches) past a distal end of the inner liner 14.

Referring to FIGS. 1 and 4-7, the catheter 10 further comprises a handle 40 secured at a proximal end of the isolation sheath 22. The handle 40 comprises a housing 41 that supports the components of the handle. The housing 41 has a generally elongate egg shape and includes a plurality of housing sections secured together to enclose the internal components of the handle 40. In the illustrated embodiment, the housing 41 includes a bottom housing section 41A, a middle housing section 41B secured to the top of the bottom housing section, and a top housing section 41C secured to the top of the middle housing section. In one embodiment, the bottom housing section 41A is removable from the middle housing section 41B to provide access to the components of the handle 40 in the interior of the housing 41 by a user. It will be understood that the housing 41 can have other shapes and configurations without departing from the scope of the disclosure.

Figure 6:
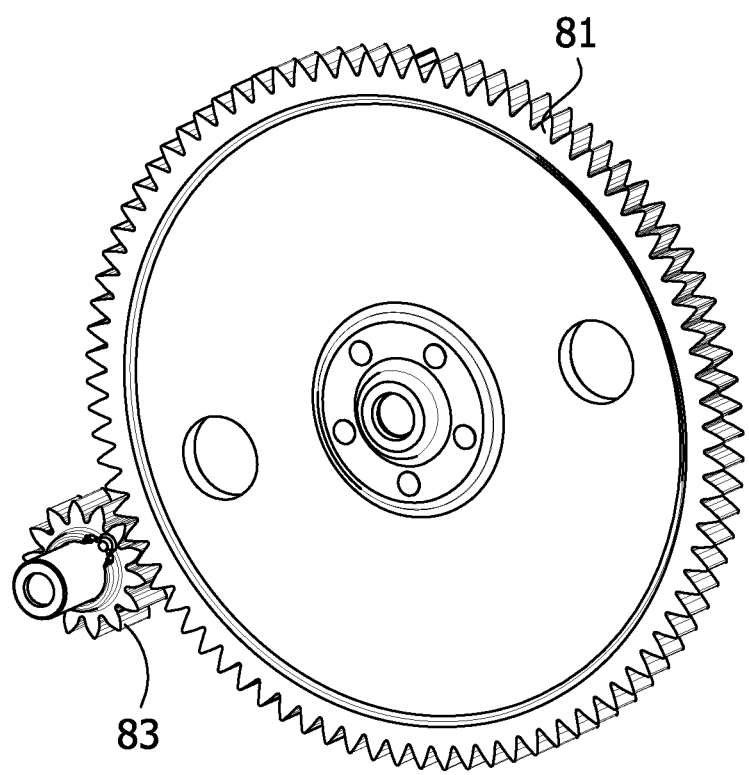
FIG. 6 is a perspective of gears of a gear assembly in the handle.
Figure 7:
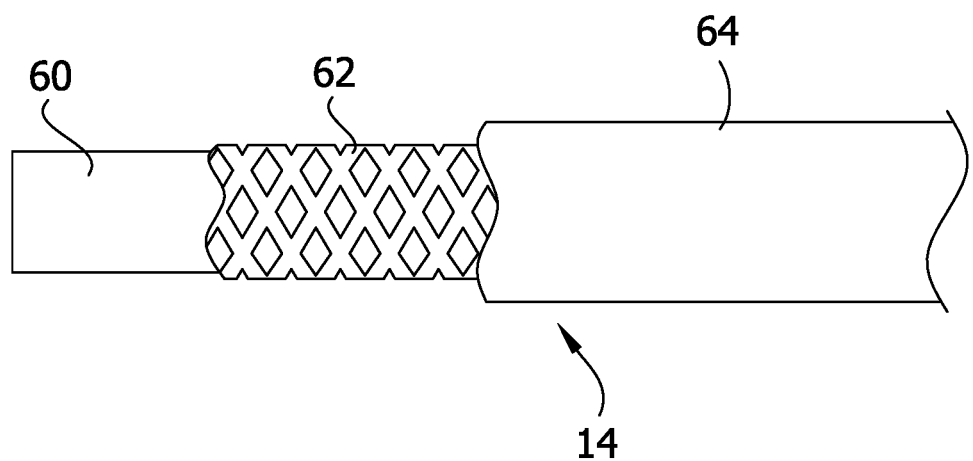
FIG. 7 is a fragmentary elevation of an isolation liner of the catheter with portions broken away to show internal details.

The housing 41 supports an actuator 42 (e.g., a lever, a button, a dial, a switch, or other device) configured for selectively actuating a motor 43 disposed in the handle to drive rotation of the drive coil 12, and the tissue-removing element 20 mounted at the distal end of the drive coil. The motor 43 is configured to rotate the drive coil 12 and tissue-removing element 20 at speeds of greater than about 80,000 RPM. The motor 43 is coupled to the drive coil 12 by a gear assembly 44 and drive assembly 48 supported within the housing 41. The gear assembly 44 comprises a gearbox housing 55 that mounts and at least partially encloses a pair of gears for transferring the rotation of a shaft of the motor 43 to the drive coil 12. The gearbox housing 55 also attaches to a carriage or advancer frame 73 for moving the motor 43 and gear assembly 44 within the housing 41. Further, attaching the gearbox housing 55 to the distal end of the advancer frame 73 secures the motor 43 in the advancer frame so that the motor moves along with the advancer frame. A driver gear 81 is attached to the motor 43 such that the driver gear rotates with the motor shaft when the motor 43 is activated (FIG. 6). A driven gear 83 is in mesh with the driver gear 81 so that rotation of the driver gear causes the driven gear to rotate in the opposite direction. The drive assembly 48 attaches the driven gear 83 to the drive coil 12 so that the rotation of the driven gear causes the drive coil to rotate. A controller 50 may be provided in the handle 40. The controller 50 may be programmed to control operation of the catheter.

It is understood that other suitable actuators, including but not limited to touchscreen actuators, wireless control actuators, automated actuators directed by a controller, etc., may be suitable to selectively actuate the motor in other embodiments. In some embodiments, a power supply may come from a battery (not shown) contained within the handle 40. The battery can provide the current source for the guidewire detection circuit. In other embodiments, the power supply may come from an external source.

Figure 4:
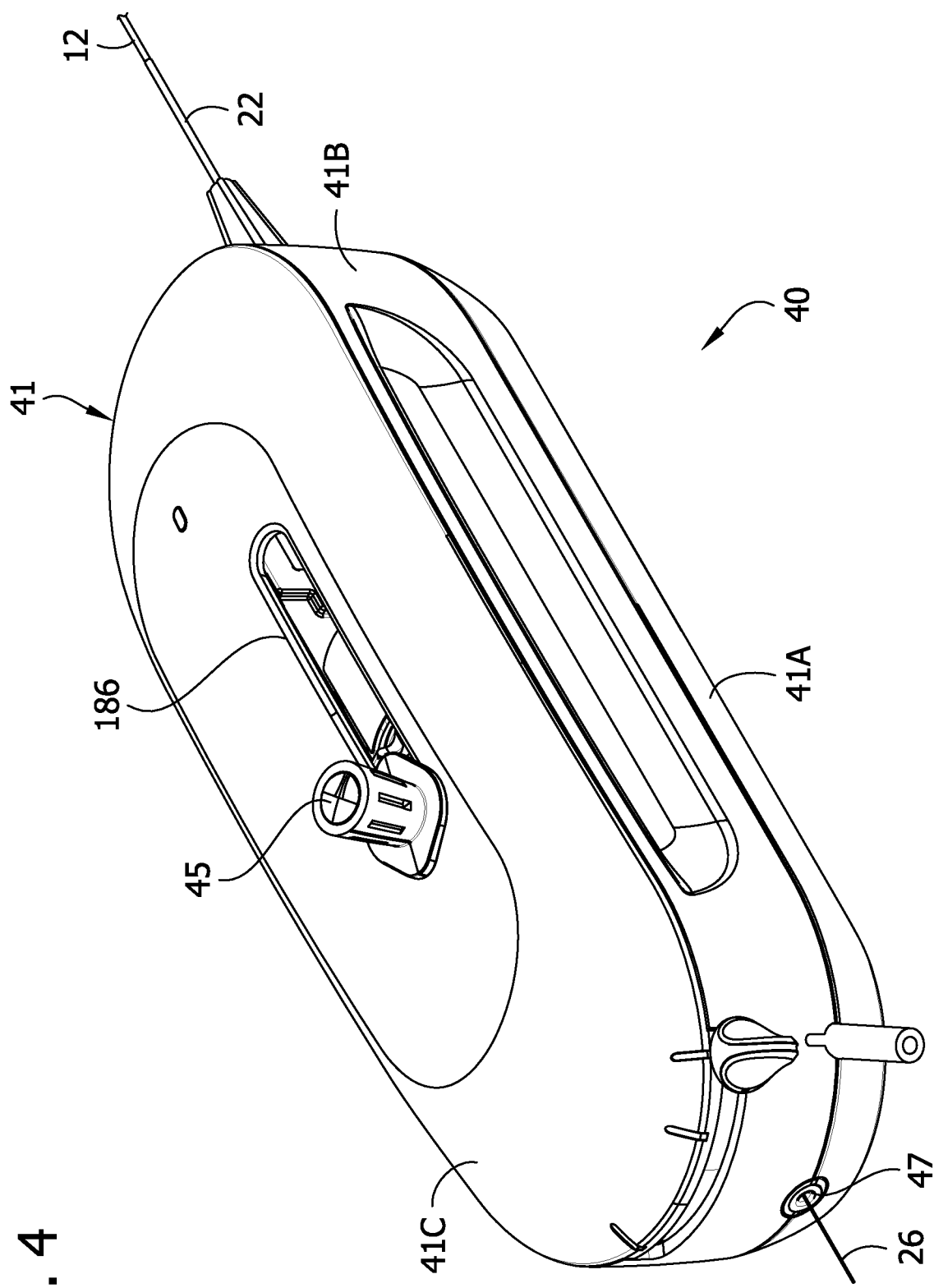
FIG. 4 is a top perspective of a handle of the catheter.
Figure 5:
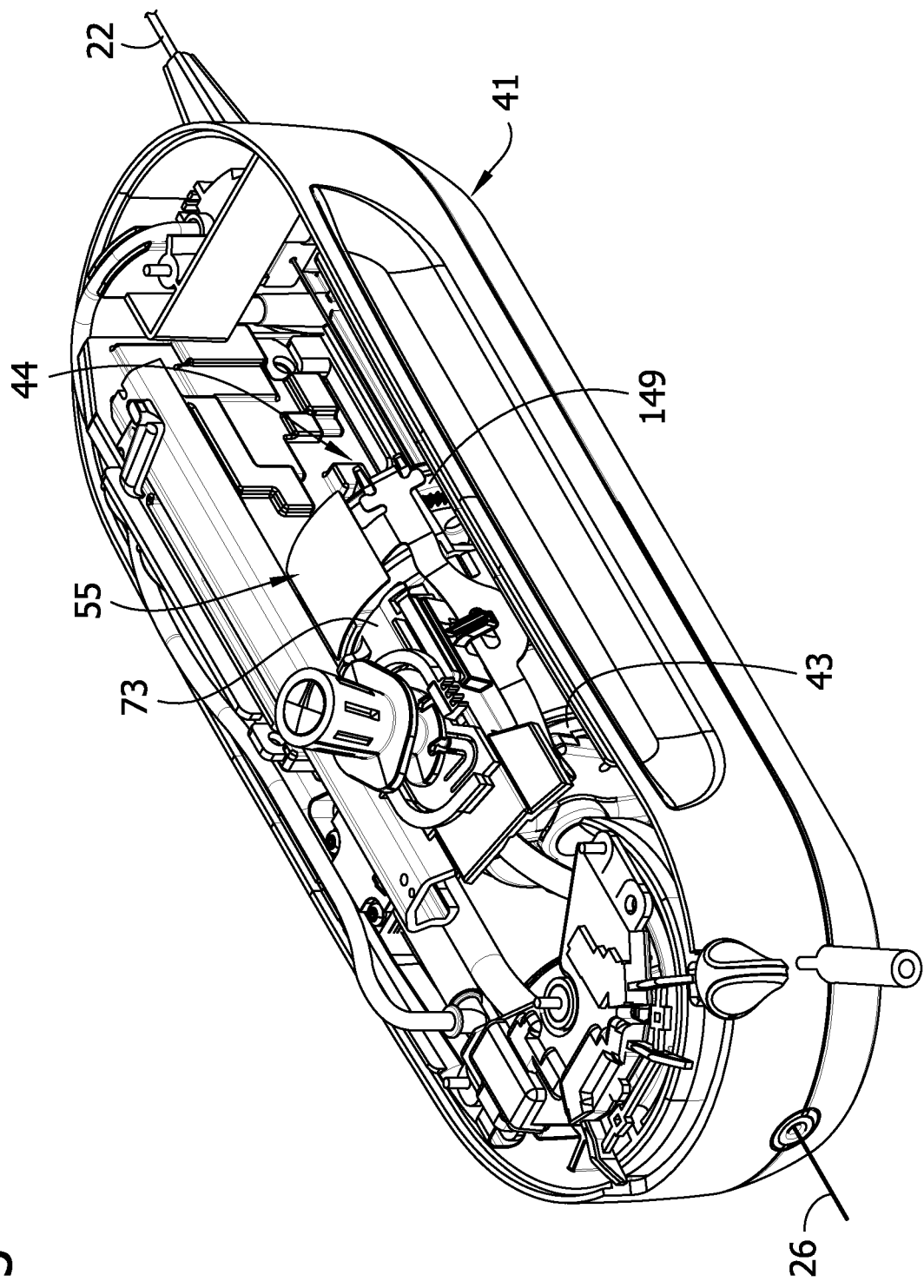
FIG. 5 is a top perspective of the handle with a top housing section removed.

Referring to FIGS. 1, 4, and 5, a slide or advancer 45 is positioned on the handle 40 and is operatively coupled to the inner liner 14 for movement of the inner liner relative to the handle to advance and retract the inner liner, drive coil 12, and tissue-removing element 20. The housing 41 of the handle 40 may define a slot 186 which limits the movement of the slide 45 relative to the handle. Thus, the length of the slot 186 determines the amount of relative movement between the inner liner 14 and the handle 40. In one embodiment, the slot has a length of about 70 mm (2.8 inches). The slide 45 is operatively attached to the advancer frame 73 so that movement of the slide causes movement of the advancer frame. The advancer frame 73 comprises an arch shaped body configured to slidingly receive the cylindrically shaped motor 43. Bearings 149 (FIG. 5) are mounted on the frame 73. The bearings 149 engage the housing 41 so that the bearings can slide along the housing to facilitate movement of the frame 73 in the housing.

Referring to FIGS. 1, and 3, the isolation sheath 22 comprises a tubular sleeve configured to isolate and protect a subject's arterial tissue within a body lumen from the rotating drive coil 12. The isolation sheath 22 is fixed to the handle 40 at a proximal end of the sheath and does not rotate. The isolation sheath 22 provides a partial enclosure for the drive coil 12 and inner liner 14 to move within the sheath. The inner diameter of the isolation sheath 22 is sized to provide clearance for the drive coil 12. The space between the isolation sheath 22 and the drive coil 12 allows for the drive coil to rotate within the sheath and provides an area for saline perfusion between the sheath and drive coil. The outer diameter of the isolation sheath 22 is sized to provide clearance with an inner diameter of a guide catheter (not shown) for delivering the catheter 10 to the desired location in the body lumen. In one embodiment, the isolation sheath 22 has an inner diameter of about 0.050 inches (1.27 mm), an outer diameter of about 0.055 inches (1.4 mm), and a length of about 1500 mm (59 inches). The isolation sheath 22 can have other dimensions without departing from the scope of the disclosure. In one embodiment, the isolation sheath 22 is made from Polytetrafluorethylene (PTFE). Alternatively, the isolation sheath 22 may comprise a multi-layer construction. For example, the isolation sheath 22 may comprise an inner layer of perfluoroalkox (PFA), a middle braided wire layer, and an outer layer of Pebax.

Referring to FIGS. 1-3, the drive coil 12 may comprise a tubular stainless steel coil configured to transfer rotation and torque from the motor 43 to the tissue-removing element 20. Configuring the drive coil 12 as a coiled structure allows for the rotation and torque of the drive coil 12 to be applied to the tissue-removing element 20 when the catheter 10 is traversed across a curved path. The coil configuration of the drive coil 12 is also configured to expand its inner diameter when the coil is rotated so that the drive coil remains spaced from the inner liner 14 during operation of the catheter 10. In one embodiment, the drive coil 12 has an inner diameter of about 0.023 inches (0.6 mm) and an outer diameter of about 0.035 inches (0.9 mm). The drive coil 12 may have a single layer construction. For example, the drive coil may comprise a 7 filar (i.e., wire) coil with a lay angle of about 30 degrees. Alternatively, the drive coil 12 could be configured from multiple layers without departing from the scope of the disclosure. For example, the drive coil 12 may comprise a base coil layer and a jacket (e.g., Tecothane™) disposed over the base layer. In one embodiment, the drive coil comprises a 15 filar coil with a lay angle of about 45 degrees. The Tecothane™ jacket may be disposed over the coil. Alternatively, the drive coil 12 may comprise a dual coil layer configuration which also includes an additional jacket layer over the two coil layers. For example, the drive coil may comprise an inner coil layer comprising a 15 filar coil with a lay angle of about 45 degrees, and an outer coil layer comprising a 19 filar coil with a lay angle of about 10 degrees. Drive coils having other configurations are also envisioned.

Referring to FIGS. 1-3 and 7, the inner liner 14 comprises a multiple layer tubular body configured to isolate the guidewire 26 from the drive coil 12 and tissue-removing element 20. The inner liner 14 extends through the handle 40 from a position within the handle to a position distal of the handle. The inner liner 14 has an inner diameter that is sized to pass the guidewire 26. The inner liner 14 protects the guidewire from being damaged by the rotation of the drive coil 12 by isolating the guidewire from the rotatable drive coil. The inner liner 14 may also extend past the tissue-removing element 20 to protect the guidewire 26 from the rotating tissue-removing element. Thus, the inner liner 14 is configured to prevent any contact between the guidewire 26 and the rotating components of the catheter 10. Therefore, any metal-to-metal engagement is eliminated by the inner liner 14. This isolation of the drive coil 12 and tissue-removing element 20 from the guidewire 26 also ensures that the rotation of the drive coil and tissue-removing element is not transferred or transmitted to the guidewire. As a result, a standard guidewire 26 can be used with the catheter 10 because the guidewire does not have to be configured to withstand the torsional effects of the rotating components. Additionally, by extending the inner liner 14 through the tissue-removing element 20 and past the distal end of the tissue-removing element, the inner liner stabilizes the tissue-removing element by providing a centering axis for rotation of the tissue-removing element about the inner liner.

Figure 10:
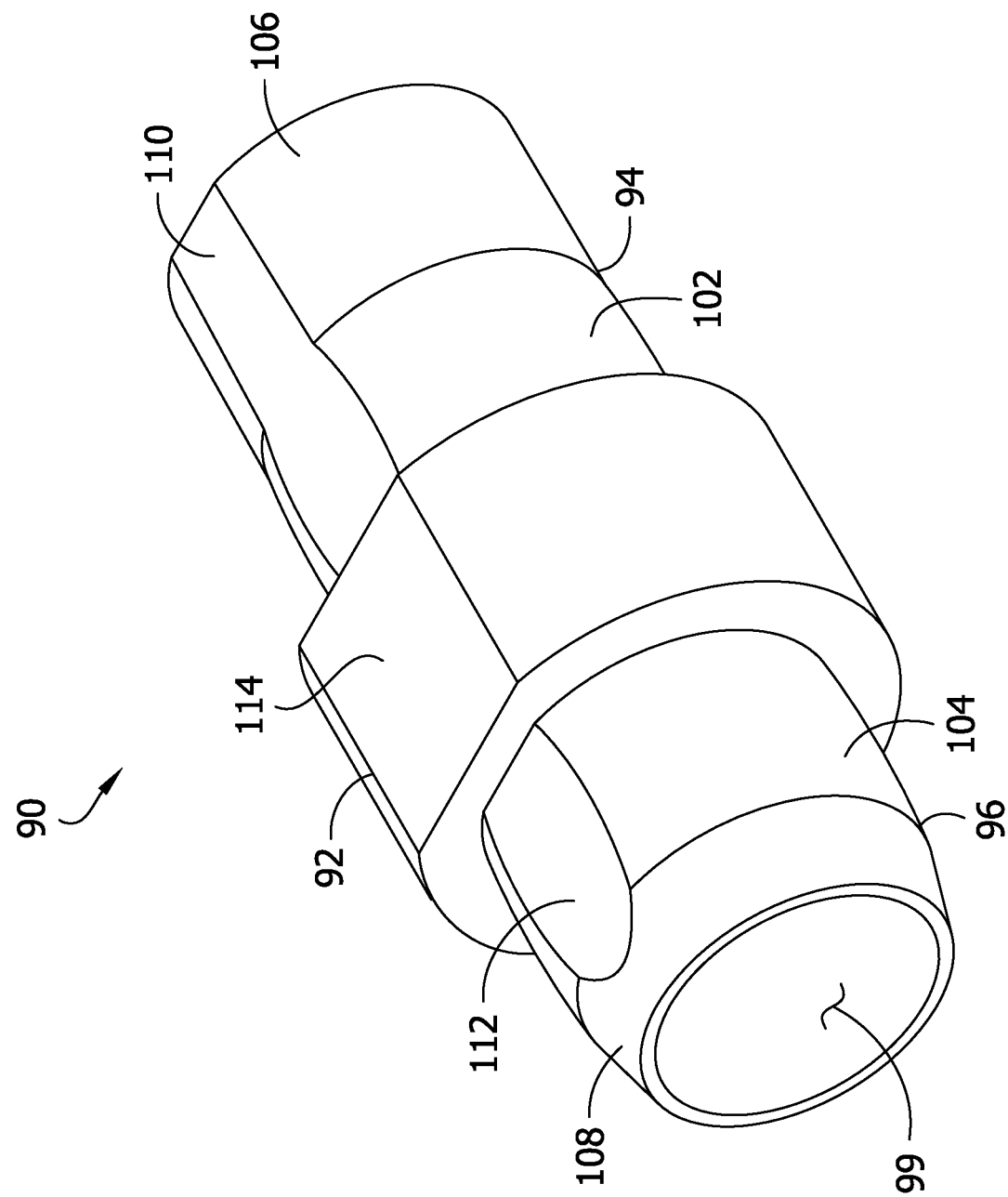
FIG. 10 is a perspective of a bushing of the catheter.

In the illustrated embodiment, the inner liner 14 comprises an inner PTFE layer 60 an intermediate braided layer 62 comprised of stainless steel, and an outer layer 64 of polyimide (FIG. 10). The PTFE inner layer 60 provides the inner liner 14 with a lubricous interior which aids in the passing of the guidewire 26 though the inner liner. The braided stainless steel intermediate layer 62 provides rigidity and strength to the inner liner 14 so that the liner can withstand the torsional forces exerted on the inner liner by the drive coil 12. In one embodiment, the intermediate layer 62 is formed from 304 stainless steel. The outer polyimide layer 64 provides wear resistance as well as having a lubricous quality which reduces friction between the inner liner 14 and the drive coil 12. Additionally, a lubricious film, such as silicone, can be added to the inner liner 14 to reduce friction between the inner liner and the drive coil 12. In one embodiment, the inner liner 14 has an inner diameter ID of about 0.016 inches (0.4 mm), an outer diameter OD of about 0.021 inches (0.5 mm), and a length of about 59 inches (1500 mm). The inner diameter ID of the inner liner 14 provides clearance for the standard 0.014-inch guidewire 26. The outer diameter OD of the inner liner 14 provides clearance for the drive coil 12 and tissue-removing element 20. Having a space between the inner liner 14 and the drive coil 12 reduces friction between the two components as well as allows for saline perfusion between the components.

In the illustrated embodiment, an atraumatic tip 68 may be attached to the distal end of the inner liner 14 (FIG. 8). The atraumatic tip 68 provides a soft, low profile distal end to facilitate delivery of the inner liner 14 through the body lumen without causing trauma. The atraumatic tip 68 may have a maximum outer diameter of about 0.02 inches (0.6 mm). Other sizes of the atraumatic tip are also envisioned.

Figure 8A:
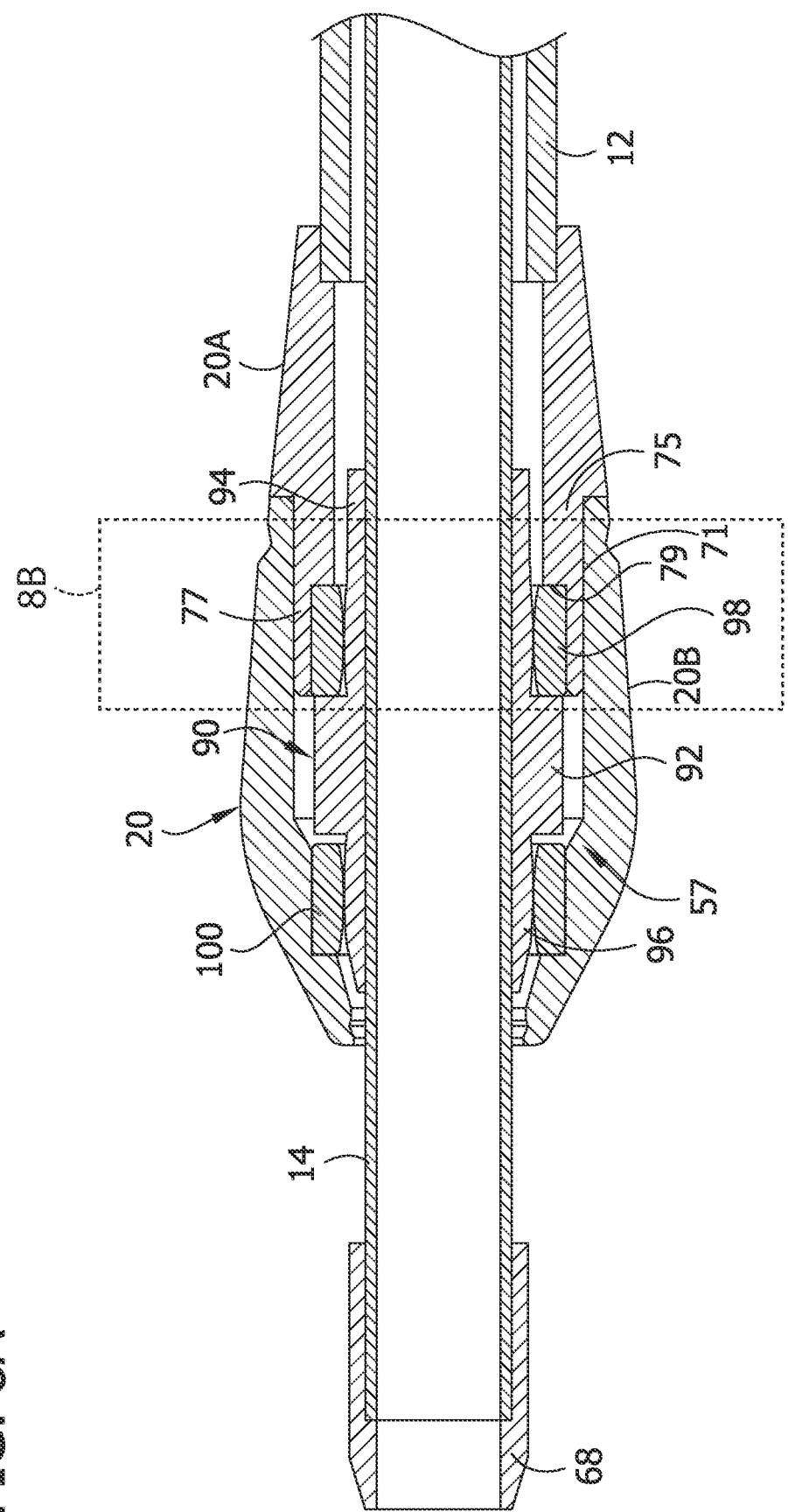
FIG. 8A is an enlarged fragmentary longitudinal cross section of the distal end portion of the catheter.
Figure 8B:
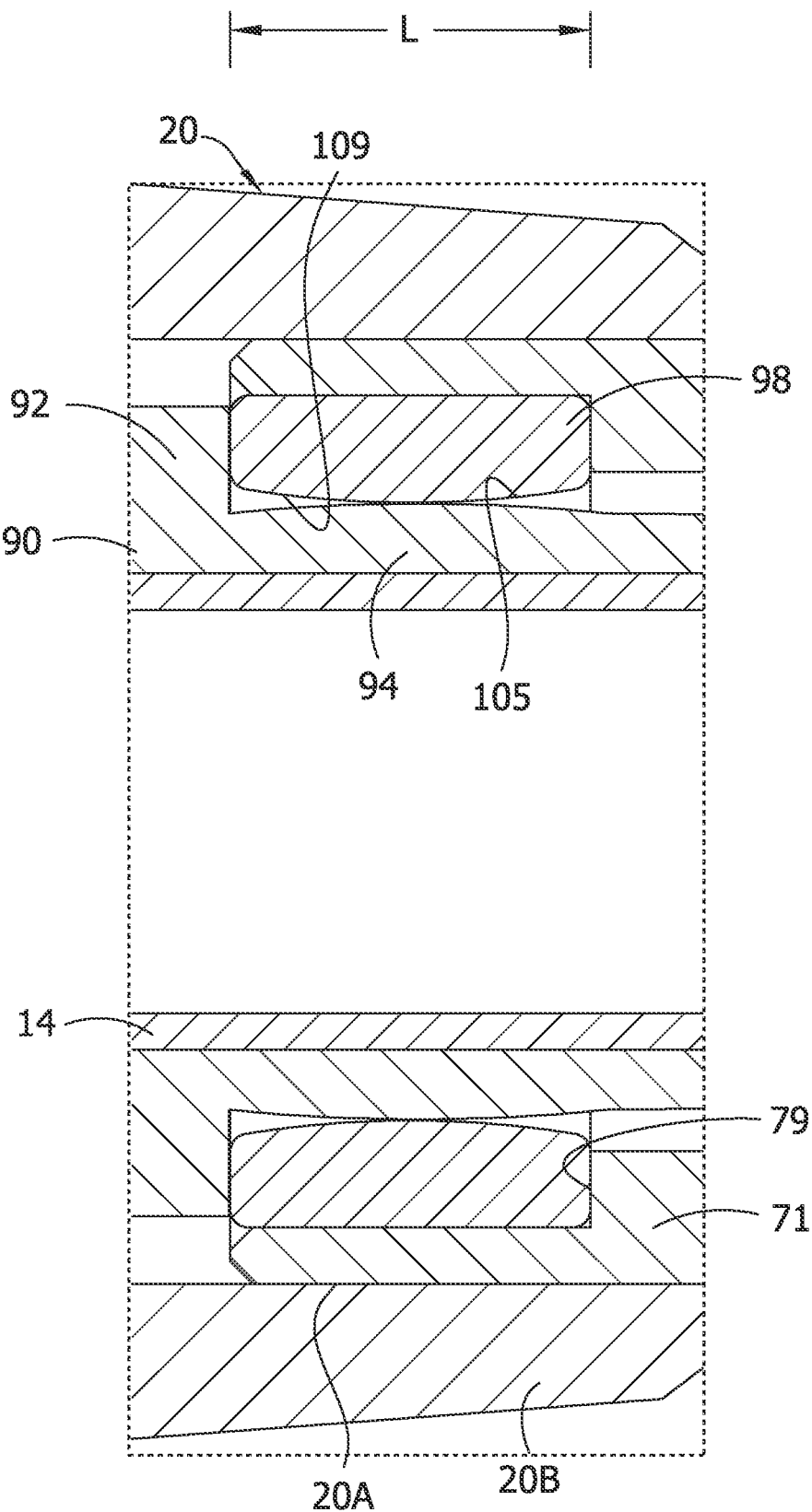
FIG. 8B is an enlarged fragmentary view of section 8A of FIG. 8A.

Referring to FIGS. 1, 2, and 8A, the tissue-removing element 20 extends along the longitudinal axis LA from a proximal end adjacent the distal end portion of the drive coil 12 to an opposite distal end. The tissue-removing element 20 is operatively connected to the motor 43 for being rotated by the motor. When the catheter 10 is inserted into the body lumen and the motor 43 is rotating the tissue-removing element 20, the tissue-removing element is configured to remove occlusive tissue in the body lumen to separate the tissue from the wall of the body lumen. Any suitable tissue-removing element for removing tissue in the body lumen as it is rotated may be used in one or more embodiments. In the illustrated embodiment, the tissue-removing element 20 comprises a proximal portion 20A attached directly to the drive coil 12 at a proximal end of the proximal portion, and a distal portion 20B attached to a distal end of the proximal portion. The proximal portion 20A of the tissue-removing element 20 comprises an extension ring 71 received in the proximal end of the distal portion 20B. The extension ring 71 has a first section 75 defining a reduced diameter section, and a second section 77 extending distally from the first section and defining an increased diameter section. The distal portion 20B of the tissue-removing element 20 comprises an abrasive burr configured to abrade tissue in the body lumen when the motor 43 rotates the abrasive burr. The abrasive burr 20 has an abrasive outer surface formed, for example, by a diamond grit coating, surface etching, or the like. In other embodiments, the tissue-removing element can comprise one or more cutting elements having smooth or serrated cutting edges, a macerator, a thrombectomy wire, etc.

Figure 9:
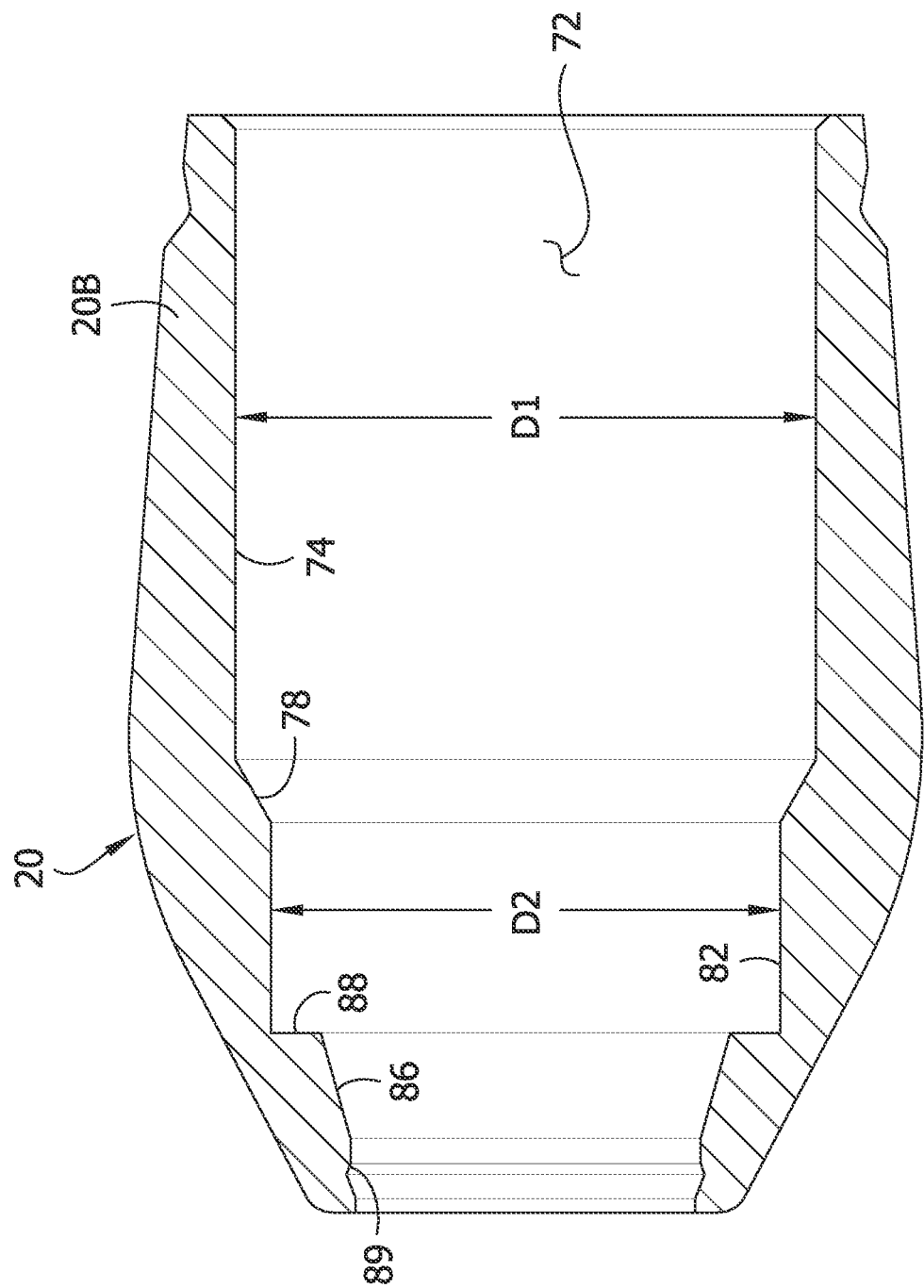
FIG. 9 is an enlarged longitudinal cross section of a distal portion of a tissue-removing element of the catheter.

Referring to FIG. 9, a cavity 72 in the distal portion 20B of the tissue-removing element 20 extends longitudinally through the distal portion of the tissue-removing element 20 such that the distal portion of the tissue-removing element defines openings at its proximal and distal ends. The cavity 72 includes a first diameter portion 74 extending distally from the proximal end of the tissue-removing element 20 and a second diameter portion 78 extending distally from the first diameter portion. In the illustrated embodiment, the first diameter portion 74 comprises a constant diameter section, and the second diameter portion 78 comprises a tapered diameter section that reduces in diameter as the second diameter portion extends distally from the first diameter portion. A third diameter portion 82 extends distally from the second diameter portion 78. A fourth diameter portion 86 extends distally from the third diameter portion 82 and forms a shoulder 88 between the third and fourth diameter portions. In the illustrated embodiment, the third diameter portion 82 comprises a constant diameter section, and the fourth diameter portion 86 comprises a tapered diameter section that reduces in diameter as the fourth diameter portion extends distally from the third diameter portion. A fifth diameter portion 89 extends distally from the fourth diameter portion 86. In the illustrated embodiment, a diameter D1 of the first diameter portion 74 is larger than a diameter D2 of the third diameter portion 82, and the diameter D2 of the third diameter portion is larger than a diameter of the fifth diameter portion 89. Other cross-sectional dimensions are also envisioned without departing from the scope of the disclosure.

As shown in FIG. 8A, the inner liner 14 extends through the drive coil 12 and past the distal end of the tissue-removing element 20. The fifth diameter portion 89 of the cavity 72 is sized to pass the inner liner 14 with a small clearance. The inner diameter of the fifth diameter portion 89 provides clearance between the tissue-removing element 20 and the inner liner 14 to reduce friction between the components. Accordingly, the tissue-removing element 20 is shaped and arranged to extend around at least a portion of the drive coil 12 and inner liner 14 and thus provides a relatively compact assembly for abrading tissue at the distal end portion of the catheter 10.

Referring to FIGS. 8A-10, a bushing 90 is received in the cavity 72 of the tissue-removing element 20 and around the inner liner 14. The bushing 90 comprises a center ring portion 92, a proximal ring portion 94 extending proximally from the center ring portion, and a distal ring portion 96 extending distally from the center ring portion. The ring portions of the bushing 90 define a channel 99 extending through the bushing that receives a portion of the inner liner 14. In the illustrated embodiment, the center ring portion 92 has a larger outer cross-sectional dimension than the proximal and distal ring portions 94, 96. The center ring portion 92 is disposed in the first and second diameter portions 74, 78 of the cavity 72, the proximal ring portion 94 is disposed in the first diameter portion 74, and the distal ring portion 96 is disposed in the second, third, and fourth diameter portions 78, 82, 86 of the cavity. The proximal ring portion 92 also extends into the extension ring 71 and is sized for close fitting inside the first section 75 of the extension ring. In one embodiment, the bushing 90 is made from polyetheretherketone (PEEK) and polytetrafluoroethylene (PTFE). In another embodiment, the bushing 90 is made from polyetheretherketone (PEEK) with carbon fiber filler. The PEEK/carbon fiber bushing 90 may be preferred for its performance in high temperatures, low coefficient of friction, and wear resistance. For example, the PEEK/carbon fiber bushing 90 can maintain its structural integrity at temperatures exceeding 300° C. However, the bushing 90 can be formed from other material without departing from the scope of the disclosure.

Referring to FIGS. 8A, 8B, 13, and 14, a first bearing 98 is disposed around the proximal ring portion 94 of the bushing 90 and received in the second section 71 of the extension ring 71. A second bearing 100 is disposed around the distal ring portion 96 of the bushing 90. In one embodiment, the bearings 98, 100 are made from Zirconia. The first bearing 98 is disposed in registration with the first diameter portion 74 of the cavity 72 in the tissue-removing element 20 and seats between a shoulder 79 of the extension ring 71 at a proximal end of the first bearing, and a proximal end of the center ring portion 92 of the bushing at a distal end of the first bearing. The second bearing 100 is disposed in registration with the third diameter portion 82 of the cavity 72 and is seated between shoulder 88 of the distal portion 20B of the tissue-removing element 20 at a distal end of the second bearing, and a distal end of the center ring portion 92 of the bushing 90 at a proximal end of the second bearing. As such the bushing 90 and bearings 98, 100 are held within the cavity 72 of the tissue-removing element 20. Broadly, the bushing 90 and bearings 98, 100 may be considered a coupling assembly 57 for coupling the inner liner 14 to the tissue-removing element 20 while separating the inner liner from a direct attachment to the tissue-removing element.

Figure 11:
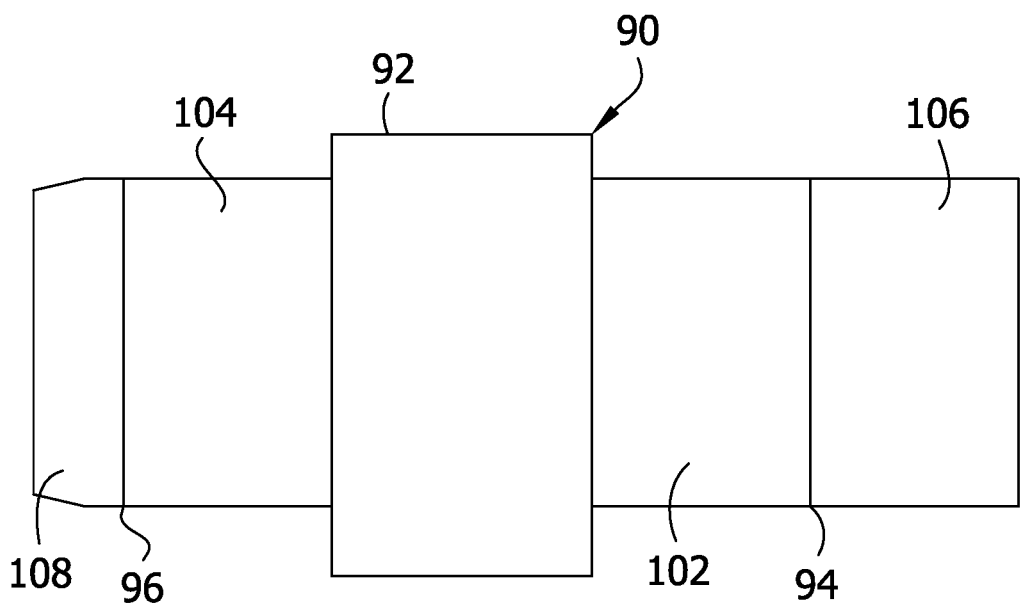
FIG. 11 is an elevation of the bushing.
Figure 12:
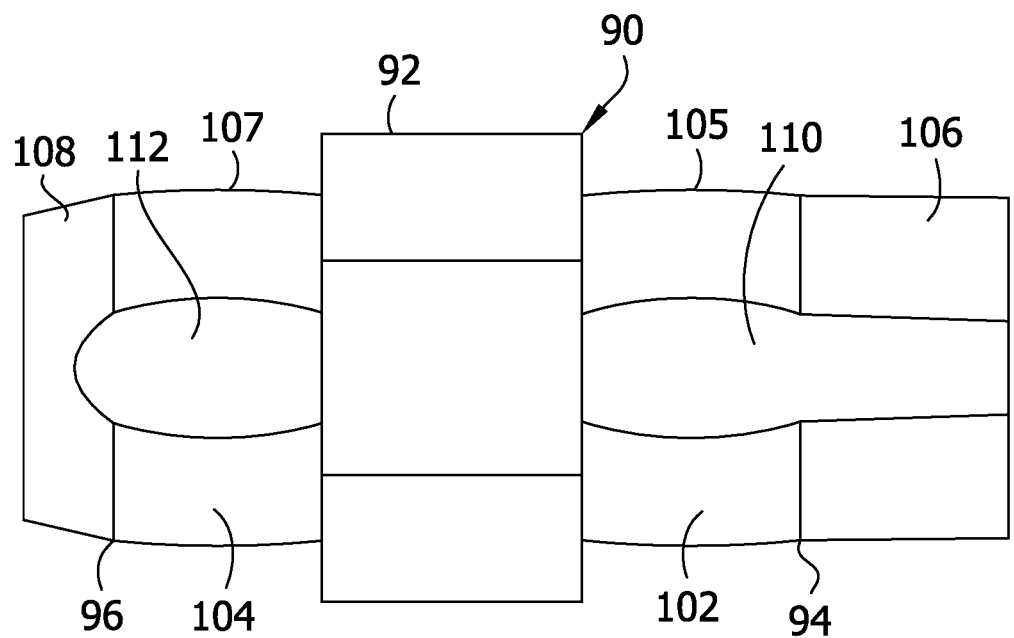
FIG. 12 is another elevation of the bushing.
Figure 13:
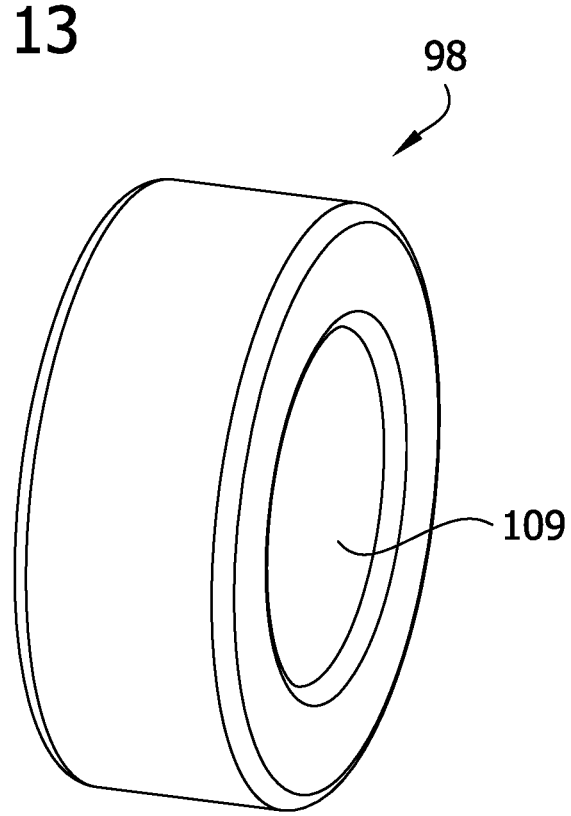
FIG. 13 is a perspective of a first bearing of the catheter.
Figure 14:
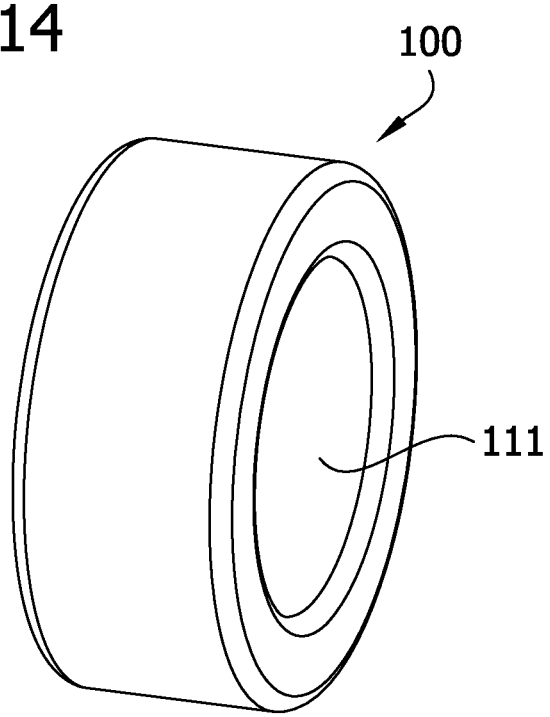
FIG. 14 is a perspective of a second bearing of the catheter.

Referring to FIGS. 11 and 12, the proximal and distal ring portions 94, 96 of the bushing 90 have varying outer dimensions in a vertical direction depending on the rotational orientation of the bushing. In particular, in the rotational orientation shown in FIG. 11, a first section 102 of the proximal ring portion 94 and a first section 104 of the distal ring portion 96 have a constant outer dimension extending along a length of the first sections. However, in the rotational position shown in FIG. 12, the first sections 102, 104 of the proximal and distal ring portions 94, 96 have a non-uniform outer dimension along the length of the first sections. In particular, the outer dimensions of the first sections 102, 104 have a generally convex or rounded shape such that the outer dimensions, as defined by outer surfaces 105 and 107 (broadly, opposing surfaces), gradually increase from a minimum dimension at one end of the first section to an apex at an intermediate location along a length of the first section, and gradually decrease to the minimum dimension at an opposite end of the first section. The rotational orientation shown in FIG. 12 is the orientation in which the bushing 90 is installed in the catheter 10. As explained in greater detail below, the bushing 90 does not rotate during operation of the catheter 10 to rotate the tissue-removing element 20. Thus, the bushing 90 remains in the rotational orientation shown in FIG. 12 during use of the catheter 10.

Referring to FIGS. 8A, 8B, and 11-14, the first bearing 98 is received around the first section 102 of the proximal ring portion 94 of the bushing 90 such that an interior surface 109 (broadly, an opposing surface) of the first bearing opposes the outer surface 105 of the bushing 90. In the illustrated embodiment, the only points of contact between the interior surface 109 of the first bearing 98 and the outer surface 105 of the first section 102 of the bushing 90 occur at the apex of the outer surface 105. Likewise, the second bearing 100 is received around the first section 104 of the distal ring portion 96 of the bushing 90 such that an interior surface 111 (broadly, an opposing surface) of the second bearing opposes the outer surface 107 of the bushing 90. In the illustrated embodiment, the only points of contact between the interior surface 111 of the second bearing 100 and the outer surface 107 of the first section 104 of the bushing 90 occur at the apex of the outer surface 107. This reduces the friction between the bushing 90 and the bearings 98, 100 thereby reducing the opportunity for heat generation during operation of the catheter 10 to rotate the tissue-removing element 20. In one embodiment, the bushing 90 contacts the first and second bearings 98, 100 over less than 50% of an internal surface area of the interior surfaces 109, 111 of the bearings. In one embodiment, the bushing 90 contacts the first and second bearings 98, 100 over less than 30% of an internal surface area of the interior surfaces 109, 111 of the bearings. In one embodiment, the bushing 90 contacts the first and second bearings 98, 100 over less than 10% of an internal surface area of the interior surfaces 109, 111 of the bearings. In one embodiment, the bushing 90 contacts the first and second bearings 98, 100 over less than 5% of an internal surface area of the interior surfaces 109, 111 of the bearings.

Referring to FIGS. 10-12, the variance in outer dimension of the proximal and distal ring portions 94, 96 is in part due to planar exterior surfaces 110 on opposed sides of the proximal ring portion 94, and planar exterior surfaces 112 on opposed sides of the distal ring portion 96. The planar surfaces 110, 112 truncate the curvature of the proximal and distal ring portions 94, 96 thereby reducing an outer dimension of the bushing 90 along an axis extending through the planar surfaces. As such, a vertical outer dimension of the proximal and distal ring portions 94, 96 in FIG. 11 is less than a vertical outer dimension of the proximal and distal ring portions in FIG. 12. The planar surfaces 110, 112 also provide manufacturing efficiencies. In particular, the planar surfaces 110, 112 counteract any "flash" (i.e., thin film of polymer left behind during molding process) so that bearing rotation around the bushing 90 is not negatively affected. In the illustrated embodiment, the planar surfaces 110, 112 extend form the center ring portion 92 to a free end of the bushing 90. A planar surface 114 on the center ring portion 92 can provide an entry point for the mold material when the bushing 90 is being formed. The outer profiles of the proximal and distal ring portions 94, 96 could have over configurations without departing from the scope of the disclosure. For example, at least a section of the proximal and distal ring portions 94, 96 could increase from a minimum dimension along a constant slope (i.e., straight line) to a plateau and then decrease along a constant slope back to the minimum dimension such that the plateau provides the point of contact between the bearings 98, 100 and bushing 90. Still other configurations for reducing the contact area between the bushing 90 and bearings 98, 100 are envisioned.

Referring to FIGS. 11 and 12, a second section 106 of the proximal ring portion 94 extends proximally from a proximal end of the first section 102 of the proximal ring portion to a free end of the bushing 90, and a second section 108 of the distal ring portion 96 extends distally from a distal end of the first section 104 of the distal ring portion to an opposite free end of the bushing. In the rotational orientation shown in FIG. 11, the second section 106 of the proximal ring portion 94 has a constant outer dimension, and the second section 108 of the distal ring portion 96 has a constant outer dimension along a first portion extending distally from the first section 104 and then has a tapering outer dimension along a second portion extending distally from the first portion. However, in the rotational orientation shown in FIG. 12, the second section 108 of the distal ring portion 96 tapers continuously from the first section 104 to a distal end of the bushing 90. The second section 106 of the proximal ring portion 94 has a constant outer dimension in the rotational orientation of FIG. 12.

It will be understood that the bushing 90 could have other configurations without departing from the scope of the disclosure. For example, rather than the non-uniform outer dimensions of the first sections 102, 104 of the proximal and distal ring portions 94, 96, the proximal and distal ring portions may have uniform outer dimensions along their entire lengths in all rotational orientations. In such an embodiment, the interior surfaces 109, 111 of the bearings 98, 100 may have a non-uniform inner dimension along the length L of the bearings. For example, the interior surfaces 109, 111 may have a rounded or convex inner surface such that the inner dimensions of the bearings gradually decrease from one end to a base at an intermediate location along the length L of the bearing and then gradually increases toward an opposite end of the bearing. This bearing configuration would allow for the point of contact between the bushing 90 and the bearings 98, 100 to occur only at the base of the interior surfaces 109, 111 of the bearings 98, 100 thereby reducing heat generation during use of the catheter 10. Still other configurations are envisioned.

Referring to FIG. 8A, an interior surface of the bushing 90 is fixedly attached to the inner liner 14 such that the inner liner is coupled to the tissue-removing element 20 through the bushing. In one embodiment an adhesive such as an epoxy glue bonds the bushing 90 to the inner liner 14. As such, the bushing 90 does not rotate around the inner liner 14. The drive coil 12 is directly and fixedly attached to the proximal portion 20A of the tissue-removing element 20. The tissue-removing element 20 can be fixedly attached to the distal end of the drive coil 12 by any suitable means. In one embodiment, adhesive bonds the drive coil 12 to the tissue-removing element 20. The drive coil 12 is received in the proximal portion 20A of the tissue-removing element 20. However, the inner liner 14 is not directly attached to the tissue-removing element 20, and the drive coil 12 is not directly attached to the bushing 90, bearings 98, 100, or inner liner. Thus, rotation of the drive coil 12 and tissue-removing element 20 is not transmitted to the inner liner 14 to also rotate the inner liner. Rather the tissue-removing element 20 rotates around the bushing 90 and bearings 98, 100. And because the inner liner 14 is fixedly attached to the bushing 90, which is retained within the cavity 72 of the tissue-removing element 20 by the first bearing 98 and proximal portion 20A, the inner liner 14 is coupled to the drive coil and tissue-removing element through the bushing and bearing arrangement.

Referring to FIGS. 1 and 2, to remove tissue in the body lumen of a subject, a practitioner inserts the guidewire 26 into the body lumen of the subject, to a location distal of the tissue that is to be removed. Subsequently, the practitioner inserts the proximal end portion of the guidewire 26 through the guidewire lumen 24 of the inner liner 14 and through the handle 40 so that the guidewire extends through the proximal port 47 in the handle. With the catheter 10 loaded onto the guidewire 26, the practitioner advances the catheter along the guidewire until the tissue-removing element 20 is positioned proximal and adjacent the tissue. When the tissue-removing element 20 is positioned proximal and adjacent the tissue, the practitioner actuates the motor 43 using the actuator 42 to rotate the drive coil 12 and the tissue-removing element mounted on the drive coil. The tissue-removing element 20 abrades (or otherwise removes) the tissue in the body lumen as it rotates. While the tissue-removing element 20 is rotating, the practitioner may selectively move the drive coil 12 and inner liner 14 distally along the guidewire 26 to abrade the tissue and, for example, increase the size of the passage through the body lumen. The practitioner may also move the drive coil 12 and inner liner 14 proximally along the guidewire 26, and may repetitively move the components in distal and proximal directions to obtain a back-and-forth motion of the tissue-removing element 20 across the tissue by sliding the advancer 45 back and forth within the slot 186 in the handle 40. During the abrading process, the bushing 90 and bearings 98, 100 couple the inner liner 14 to the tissue-removing element 20 and allow the drive coil 12 and tissue-removing-element to rotate around the inner liner. The inner liner 14 also isolates the guidewire 26 from the rotating drive coil 12 and tissue-removing element 20 to protect the guidewire from being damaged by the rotating components. As such, the inner liner 14 is configured to withstand the torsional and frictional effects of the rotating drive coil 12 and tissue-removing element 20 without transferring those effects to the guidewire 26. When the practitioner is finished using the catheter 10, the catheter can be withdrawn from the body lumen and unloaded from the guidewire 26 by sliding the catheter proximally along the guidewire. The guidewire 26 used for the abrading process may remain in the body lumen for use in a subsequent procedure.

When introducing elements of the present invention or the one or more embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A tissue-removing catheter for removing tissue in a body lumen, the tissue-removing catheter comprising:
   an elongate body having an axis, and proximal and distal end portions spaced apart from one another along the axis, wherein the elongate body is sized and shaped to be received in the body lumen;
   a tissue-removing element mounted on the distal end portion of the elongate body, the tissue-removing element being configured to remove the tissue as the tissue-removing element is rotated by the elongate body within the body lumen;
   an inner liner received within the elongate body and defining a guidewire lumen, the inner liner being coupled to the tissue-removing element at a distal end portion of the inner liner; and
   a coupling assembly disposed in the tissue-removing element for coupling the inner liner to the tissue-removing element, the coupling assembly comprising a bushing attached to the distal end portion of the inner liner and a bearing disposed around the bushing such that an annular exterior surface of the bushing opposes an annular interior surface of the bearing, wherein the annular exterior surface of the bushing is truncated longitudinally to define a planar longitudinal portion of the annular exterior surface,
   wherein the annular interior surface of the bearing contacts and rotates about a non-truncated portion of the annular exterior surface of the bushing during rotation of the tissue-removing element.

2. The tissue-removing catheter as set forth in claim 1, wherein the exterior surface of the bushing contacts the interior surface of the bearing along less than 50% of the internal surface area of the interior surface of the bearing.

3. The tissue-removing catheter as set forth in claim 2, wherein the exterior surface of the bushing contacts the interior surface of the bearing along less than 10% of the internal surface area of the interior surface of the bearing.

4. The tissue-removing catheter as set forth in claim 1, wherein at least one of the exterior surface of the bushing and the interior surface of the bearing defines a non-uniform dimension extending along a length of one of the bushing and bearing.

5. The tissue-removing catheter as set forth in claim 4, wherein at least one of the exterior surface of the bushing and the interior surface of the bearing is rounded along the length of one of the bushing and bearing.

6. The tissue-removing catheter as set forth in claim 4, wherein the exterior surface of the bushing defines the non-uniform dimension along the length of the bushing.

7. The tissue-removing catheter as set forth in claim 1, wherein the bushing includes a center ring portion, a proximal ring portion extending proximally from the center ring portion, and a distal ring portion extending distally from the center ring portion, the exterior surface of the bushing being located on one of the proximal ring portion and distal ring portion.

8. The tissue-removing catheter as set forth in claim 7, wherein the exterior surface of the bushing defines a non-uniform dimension extending along the length of the bushing.

9. The tissue-removing catheter as set forth in claim 1, wherein the bearing comprises a first bearing, a second bearing being disposed around the bushing such that a second exterior surface of the bushing opposes an interior surface of the second bearing, the second exterior surface of the bushing contacting the interior surface of the second bearing along less than 50% of an internal surface area of the interior surface of the second bearing.

10. The tissue-removing catheter as set forth in claim 1, wherein the bushing is made from polyetheretherketone (PEEK) with carbon fiber filler.

* * * * *